Patented May 18, 1954

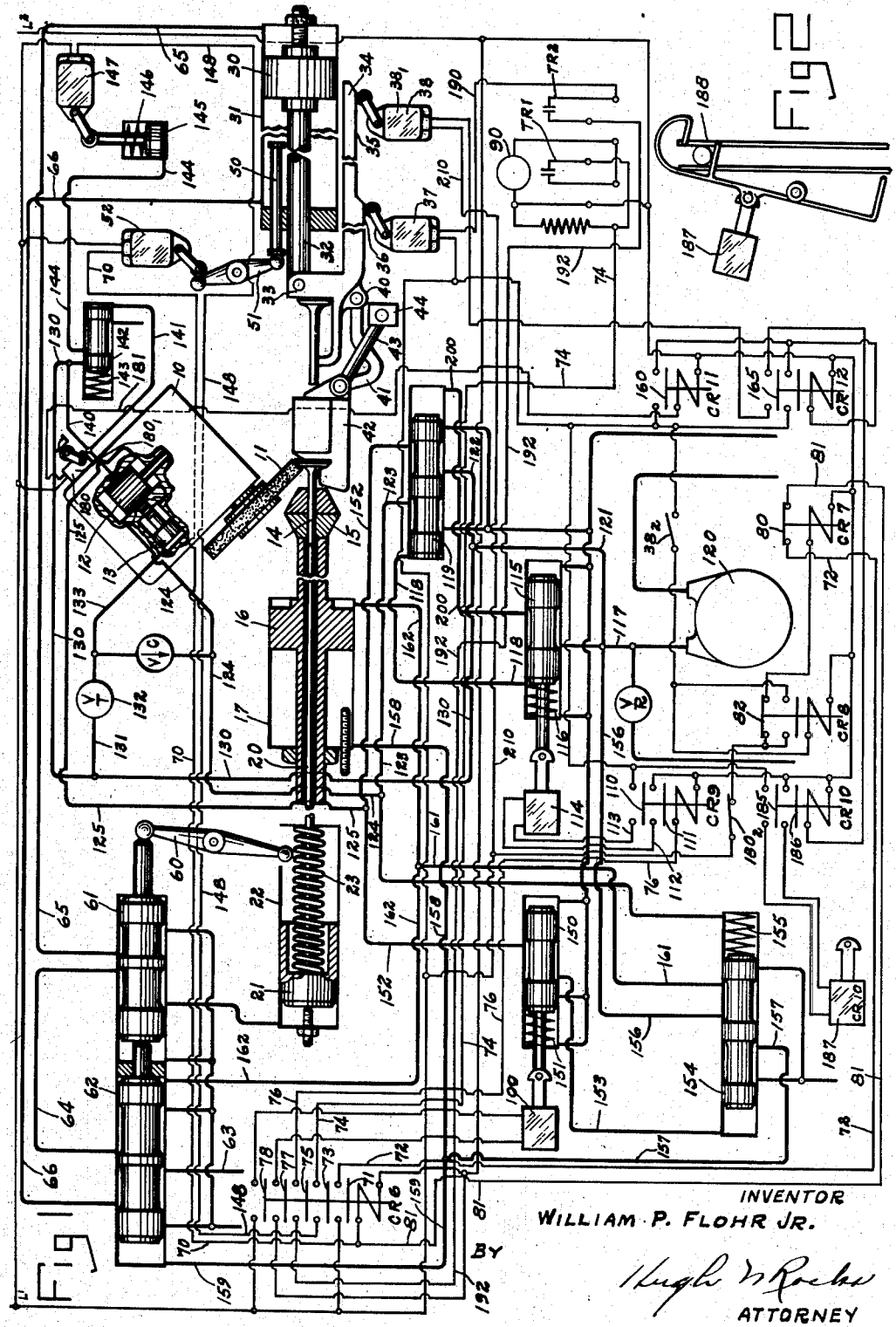

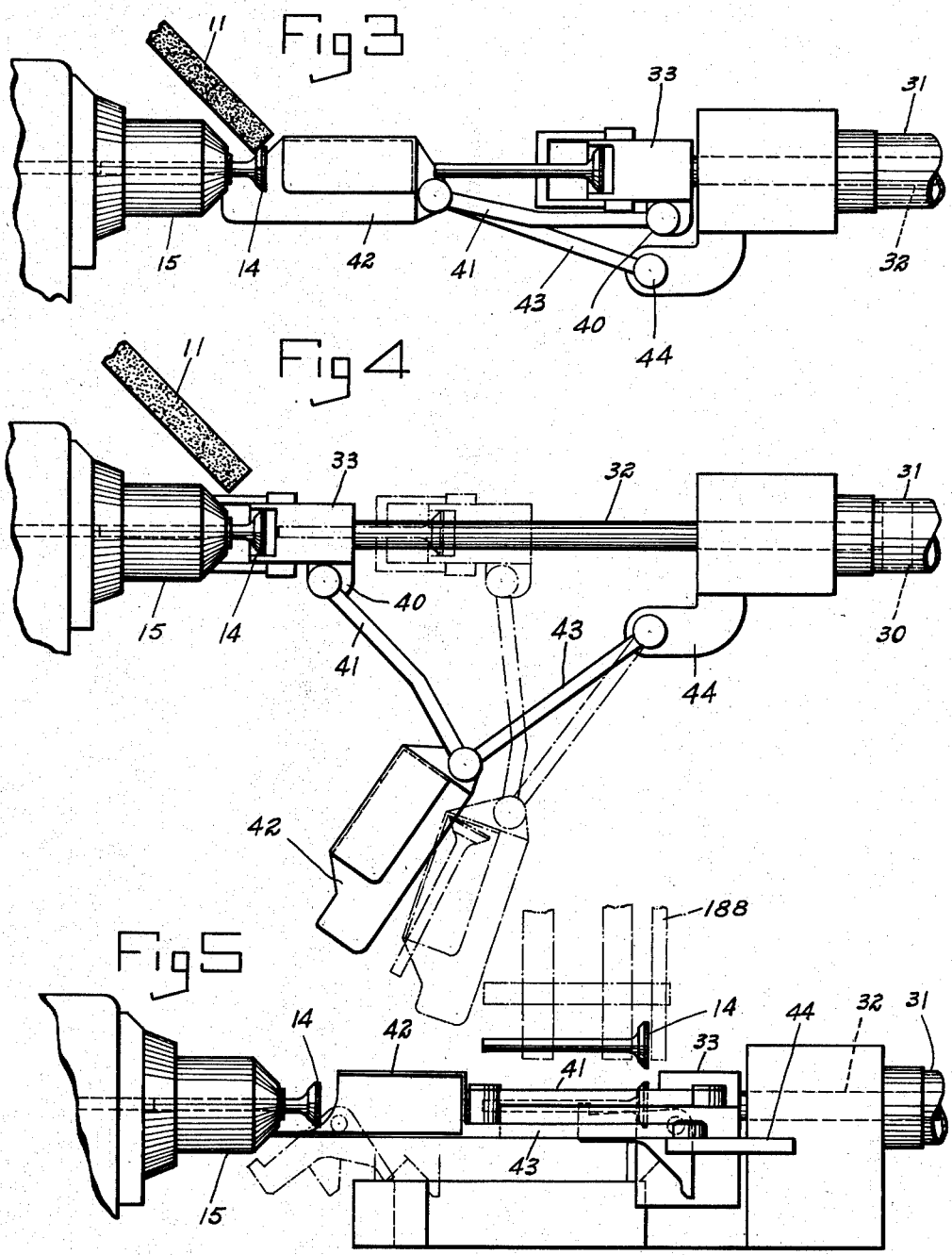

2,678,521

UNITED STATES PATENT OFFICE 2,678,521

VALVE GRINDING APPARATUS

William P. Flohr, Jr., Waynesboro, Pa., assignor to Landis Tool Company, Waynesboro, Pa.

Application March 2, 1951, Serial No. 213,652

5 Claims. (Cl. 51—105)

This invention relates to machines for grinding the faces of internal combustion engine valves. Previous machines of this type had automatic means for effecting the ejection of the work and the movement of the grinding wheel toward and from operative position. Numerous attempts have been made to produce apparatus for removing valves from a conveyor and place them in a chuck. So far, none of these has been particularly satisfactory.

It is, therefore, an object of this invention to provide apparatus wherein valves may be loaded, ground and ejected continuously in an automatic cycle.

A further object is to provide a new and improved mechanism for receiving a work piece and placing it in a chuck.

A further object is to provide a machine in which several of the functions are initiated in response to the reciprocations of the work loading apparatus.

In the drawings,

Figure 1 is a combined hydraulic, electrical and mechanical diagram showing the relation of the various elements of the invention.

Figure 2 is an elevation of a work feeding device.

Figure 3 shows the work loading device, grinding wheel and a work removing member in grinding position.

Figure 4 shows the same apparatus with an unground work piece being placed in a chuck and a ground work piece being discharged from the machine by the work removing member.

Figure 5 is a front elevation showing the relation of the work feed apparatus of Figure 2 with the elements shown in Figures 3 and 4.

In the drawings, numeral 10 indicates a wheelbase having a grinding wheel 11 rotatably mounted thereon. Said wheelbase is movable toward and from operative position at an angle corresponding to the angle of the face to be ground on the work piece. The means for moving the grinding wheel toward and from operative position consists of rapid feed piston 12 and a slow feed piston 13, both of which are described in detail in Patent 2,313,479.

A work piece 14 is held in a chuck 15 rotatably mounted in a headstock of any suitable construction. Said chuck is actuated by a piston 16 slidably mounted in cylinder 17. Means for removing work piece 14 from chuck 15 consists of an ejecting rod 20 attached to piston 21 in cylinder 22. Said piston is held in inoperative position by means of a spring 23. The means for loading a work piece into a chuck consists of a piston 30 slidably mounted in cylinder 31. A piston rod 32 is operatively connected to a work holding bracket 33. An extension 34 of said bracket has spaced cam surfaces 35 and 36 actuating limit switches 37 and 38, the function of which will be discussed later.

A lug 40 on bracket 33 provides a pivotal support for an arm 41 having a work removing member 42 attached thereto. A link 43 is pivotally connected at one end to said work removing member and at the other end to a fixed support 44. Piston 30 also operates through a plunger 50 in cylinder 31 and lever 51 to actuate limit switch 52, the function of which will be described later.

The feeding mechanism for wheelbase 10 includes a jet feed control similar to that disclosed in Patent No. 2,486,244, granted October 25, 1949, except that the pressure built up as a result of restriction of the jet acts to shift a valve to connect a pressure-operated limit switch 147 with a supply of fluid under pressure.

Operation

Assuming that a work piece 14 has just been ejected by movement of ejector piston 21 to the right, the movement of said piston moves lever 60 in a counterclockwise direction to shift ejector valve 61 and loader valve 62 to the left. In this position of the two valves, air from supply line 63 is directed by valve 62 through line 64 to ejector valve 61, which in turn directs said air through line 65 to the head end of loading cylinder 31. Piston 30 in cylinder 31 is thus moved to the left to place another work piece in chuck 15. This movement of piston 30 is effected through arm 41 and link 43 to swing work removing member 42 in a counterclockwise direction to discharge a finished work piece. At the same time, the unground work piece is placed in chuck 15. Movement of piston 30 to the left is also effective through plunger 50 to actuate limit switch 52, which completes a circuit through line 70 to energize CR6.

When CR6 is energized, a circuit is completed through contact 71, line 72 and normally closed contact 80 of CR7 and line 81 to hold CR6 energized. Another circuit is completed through contact 73 and line 74 to initiate operation of a timer 90. A third contact 75 closes a circuit through line 76 to CR9. At the same time, the remaining contacts 77 and 78 close a circuit to the chuck pilot valve solenoid 100, shifting valve 150 to the left against spring 151 and connecting the left end of valve 154 with an exhaust line. Valve 154 is then shifted to the left by spring 155. In this position, fluid from line 117 and line 156 is directed through line 157 and line 158 to the left end of chuck cylinder 17, shifting chuck piston 16 to the right to grip work piece 14.

The fluid from line 157 also passes through line 159 to the left end of loader valve 62, shifting said valve, as well as ejector valve 61, to the right. In this position of the loader valve, air under pressure from line 63 is connected to line 66, leading to the left end of loading cylinder 31 and causing loading piston 30 with associated parts to return to work receiving position. This movement of piston 30 releases switch 52 to CR6, but CR6 is already held through the normally closed contact 80 of CR7. This movement of piston 30 causes extension 34 of bracket 33 through cam surfaces 35 and 36 thereon to actuate switches 38 and 37 respectively. Switch 38 has two poles which will be referred to hereafter as switch 38₁ and 38₂. Switch 38₁ closes a circuit from L1 through line 210 to energize CR10 and contact 165 of CR12. CR12 is energized through contact 160 of CR11. CR11 is energized by switch 180 so long as wheel support 10 is in the back position. Switch 180 has two poles which will be referred to hereafter as 180₁ and 180₂. CR10 then completes circuits through its contacts 185 and 186 to energize indexing solenoid 187. Said solenoid actuates an escapement device 188, permitting a work piece 14 to drop from a conveyor (not shown) into position in loader bracket 33.

When loader piston 30 is forward, switch 38₂ is closed to energize CR8 and open contact 82 thereof. Opening contact 82 breaks the circuit to CR7, which includes switch 180₂ which is closed when the wheelbase is back. The function of CR7 is to deenergize CR6 while the loader is placing a work piece in the chuck. This prevents other functions of the machine from accidental operation during the chucking of a work piece.

Closing limit switch 37 completes a circuit from L1 through line 190, TR2 and line 192 through contact 75 of CR6 to energize CR9. When CR9 is energized, circuits are completed through two contacts 110 and 111 and lines 112 and 113 to energize rapid feed valve solenoid 114, shifting the valve 115 to the left against spring 116 and directing fluid from pressure line 117 through line 118 to the left end of valve 119, shifting said valve to the right. In this position, fluid under pressure from pump 120, passing through lines 117, 121 and 122, is directed by said valve through line 123 and line 124 to the head end of piston 12 to move wheel support 10 into position for grinding wheel 11 to grind the face of valve 14. Fluid from line 121 also passes through lines 130, 131, throttle valve 132 in line 133 to the head end of slow feed piston 13.

When wheel support 10 moves to grinding position, it closes switch 180₁ and opens 180₂. Switch 180₁, which is connected through line 181 to CR11, energizes CR11 and closes contact 160 thereof to in turn energize CR12. Energizing CR12 closes the circuit through contact 165 to solenoid 187, which actuates escapement device 188 to drop a work piece into loading bracket 33. This circuit through contact 165 includes contact 38₁ of index limit switch 38. Thus, the loader and extension 34 must be in the right-hand position so that switch 38 can complete the circuit. This means that the wheelbase must be in grinding position and the loading device in work receiving position before the escapement device functions to drop a new work piece to the loader. However, so far as the function of solenoid 187 is concerned, it is essential only that the loader be in position to receive the work. The position of the wheelbase is of secondary importance and may be either in or out. When switch 180₂ is opened upon the movement of wheel support 10 to grinding position, it breaks the circuit through contact 82 of CR8 to deenergize CR7, closing contact 80 thereof so that the holding circuit to CR6 will be in readiness after the actuation of CR6 by the movement of loading piston 30 through switch 52.

When slow feed piston 13 completes its stroke, it restricts the flow of fluid through line 140, which is supplied from line 130. Said fluid then passes through line 141 to the right end of valve 142, shifting said valve to the left against spring 143. In this position of valve 142, fluid from line 130 is directed through line 144 to shift piston 145 against spring 146 to actuate limit switch 147. Limit switch 147 completes a circuit through line 148 and contact 73 of CR6 to initiate operation of timer 90 to determine the duration of the grinding operation. At the end of a predetermined grinding period, the timer will open TR2 to deenergize rapid feed solenoid 114 and permit valve 115 to be shifted by spring 116 to the right. In this position of valve 115, fluid under pressure from line 117 will pass through line 200 to the right end of valve 119, shifting said valve to the left. In the left-hand position of valve 119, fluid under pressure from line 122 will be directed through line 152 and line 125 to the rod end of pistons 12 and 13, withdrawing wheelbase 10 from grinding position and resetting the slow feed piston 13.

Resetting piston 13 removes the restriction to flow of fluid from line 140. Removing the restriction from line 140 releases the pressure on the right-hand end of valve 142, permitting said valve to be moved to the right by spring 143. In this position of valve 142, line 144 is opened to exhaust, permitting spring 146 to move piston 145 downwardly and release limit switch 147. Opening switch 147 stops and resets timer 90.

In the back position of wheelbase 10, switch 180₁ is opened to deenergize CR11 and CR12, which in turn deenergize CR10 and solenoid 187, thus releasing escapement device 188 to prevent the dropping of more than one work piece at a time onto loader bracket 33.

In the back position of the wheelbase, switch 180₂ is closed to energize CR7 through contact 82 of CR8. Energizing CR7, as described before, opens contact 80 thereof to open the holding circuit to CR6. Deenergizing CR6 opens contacts 77 and 78 to chuck valve solenoid 100, releasing valve 150 which is moved to the right by spring 151. In this position, valve 150 connects line 152 with line 153 to shift valve 154 to the right against spring 155. Valve 154 thus connects pressure line 156 with line 161 leading through line 162 to the right end of chuck piston 16 and also to the right end of loader valve 62. When chuck piston 16 is moved to the left, chuck 15 releases the work piece 14.

When the loader valve 62 is moved to the left, it directs air under pressure through line 64 to ejector valve 61, which is still in the right-hand position. In this position, valve 61 directs fluid to the left end of ejector cylinder 21, shifting said cylinder to the right to eject the work piece 14 into the work removing member 42.

Movement of the ejector piston 21 to the right causes movement of lever 60 in a counterclockwise direction to shift the ejector valve 61 to the left. In this position of valve 61, line 64 from valve 62 is connected with line 65 leading to the head end of loader cylinder 31 and shifting loading piston 30 to the left. This movement of piston 30 as described above results in the removal of the finished work piece by a member 42 and the placing of an unground work piece in chuck 15. The machine is then ready for another grinding cycle.

I claim:

1. In a machine of the kind described, means for rotatably supporting a work piece, including a chuck, a grinding wheel and support movable transversely toward and from operative relation with said work piece, a loading device for placing a work piece in said chuck, means for ejecting a work piece from said chuck, a member for receiving the work piece from said chuck and carrying it to a point of discharge, and means responsive to movement of said loader in placing a work piece in said chuck to actuate said member to discharge a finished work piece, said means comprising a connection between said loader and discharge member.

2. In a machine of the kind described, means for rotatably supporting a work piece, including a chuck, a grinding wheel and support movable transversely toward and from operative relation with said work piece, a motor for effecting movement of said support, a loading device for placing a work piece in said chuck, means responsive to the movement of said loading device for actuating said chuck to grip the work, and means including a switch operable by said loader upon movement to its original position to actuate said motor to cause movement of the wheel support to grinding position.

3. In a machine of the kind described, a chuck for rotatably supporting a work piece, a grinding wheel and support movable transversely toward and from operative relation with said work piece, a loading device for placing a work piece in said chuck, a relay for controlling the cycle of operations of the machine including the movement of the wheel support toward and from operative relation, and a switch operable by said loading device when in position to insert a work piece in said chuck for controlling said relay to prevent functioning of other parts of the machine including said wheel feed whereby said wheel is held in inoperative position during the chucking operation.

4. In a machine of the kind described, means for rotatably supporting a work piece, including a chuck, fluid pressure means for actuating said chuck, including a solenoid valve, an ejector for removing a work piece from said chuck, fluid pressure means for actuating said ejector including a motor, and a valve for directing fluid to actuate said motor, a shuttle valve actuated by fluid under pressure from said chucking valve, means whereby said shuttle valve shifts said ejector valve in one direction to place said ejector valve in position to direct fluid to said ejector actuating means, said fluid being operable when the chucking valve is positioned to release a work piece, to shift said shuttle valve to position to direct fluid, first to said ejector valve and then to said ejector actuating means.

5. In a machine of the kind described, means for rotatably supporting a work piece, including a chuck, fluid pressure means for actuating said chuck, including a solenoid valve, an ejector for removing a work piece from said chuck, fluid pressure means for actuating said ejector, including an ejector valve, a shuttle valve actuated by fluid under pressure from said chucking valve, means whereby said shuttle valve shifts said ejector valve in one direction to place said ejector valve in position to direct fluid to said ejector, said fluid being operable when the chucking valve is positioned to release a work piece, to shift said shuttle valve to position to direct fluid first to said ejector valve and then to said ejector actuating means, and connecting means actuated by operation of said ejector for shifting said ejector valve to direct fluid to move said loader to loading position.

References Cited in the file of this patent

UNITED STATES PATENTS

| Number | Name | Date |
|---|---|---|
| 1,023,389 | Olsen | Apr. 16, 1912 |
| 1,583,205 | Vanderbeek | May 4, 1926 |
| 2,040,449 | Stevens | May 12, 1936 |
| 2,086,052 | Silven | July 6, 1937 |
| 2,092,895 | Stevens | Sept. 14, 1937 |
| 2,260,843 | Strong | Oct. 28, 1941 |
| 2,436,561 | Flygare et al. | Feb. 24, 1948 |
| 2,527,804 | Flygare et al. | Oct. 31, 1950 |